United States Patent [19]

Rondeau

[11] 4,027,367

[45] June 7, 1977

[54] SPRAY BONDING OF NICKEL ALUMINUM AND NICKEL TITANIUM ALLOYS

[76] Inventor: Henry S. Rondeau, 2865 Coventry Road, Shaker Heights, Ohio 44120

[22] Filed: July 24, 1975

[21] Appl. No.: 598,822

[52] U.S. Cl. .................................. 428/652; 427/37; 428/653; 428/654; 428/660

[51] Int. Cl.² ..................... B05D 1/08; B32B 15/04; B32B 15/20

[58] Field of Search ........................ 427/37, 34, 423; 29/196.2, 196.6, 197, 197.5, 198

[56] References Cited

UNITED STATES PATENTS

| | | | |
|---|---|---|---|
| 3,338,688 | 8/1967 | Longo | 427/423 |
| 3,436,248 | 4/1969 | Dittrich et al. | 427/423 |
| 3,481,715 | 12/1969 | Whalen et al. | 427/34 X |
| 3,640,755 | 2/1972 | Barth | 427/423 X |
| R22,397 | 11/1943 | Meduna | 427/37 |

*Primary Examiner*—James R. Hoffman

*Attorney, Agent, or Firm*—Donnelly, Maky, Renner & Otto

[57] ABSTRACT

An alloy of nickel and aluminum, which also may contain varying percentages of intermetallics, in the form of a wire or rod is sprayed in an electric arc spray gun to form a self-bonding coating on a smooth, clean substrate. Alternatively an alloy of nickel and titanium, which also may contain varying percentages of intermetallics, in the form of a wire may be similarly electric arc sprayed to effect a self-bonding coating on a substrate. The nickel aluminum alloy and possibly intermetallics or the nickel titanium alloy and possibly intermetallics are supplied as a wire feed to the electric arc spray gun, and when heated in the electric arc of the spray gun and sprayed onto a substrate will form a coating that has a high degree of tenacity to many metal substrates and also has a moderate degree of hardness, low $R_c$, high $R_b$. The self-bonding is attributed to the formation of superheated liquid in the arc process and the affinity of that superheated liquid to iron, nickel, aluminum, etc.

17 Claims, 4 Drawing Figures

SPRAY BONDING OF NICKEL ALUMINUM AND NICKEL TITANIUM ALLOYS

BACKGROUND OF THE INVENTION

This invention relates to a method of electric arc spraying self-bonding materials and an article formulated by the same. More specifically, the invention relates to a thermal spraying of nickel aluminum alloys or nickel titanium alloys, which alloys may include varying percentages of intermetallics of nickel and aluminum or nickel and titanium, respectively, in wire form using an electric arc spray gun.

The use of thermal sprayed coatings has been widely accepted in recent years, for example, for protecting substrates for cryogenic or refractory purposes, for parts repair, for protection of a substrate from oxidizing or from other hostile environments, and for many other purposes. However, the search for new materials with which to spray and new techniques for spraying is continuing in an effort to achieve better coatings befitting new applications and time saving methods particularly to avoid preliminary base or substrate preparation and/or post coating and base treatment.

Several types of thermal spraying guns are available including combustion flame spray guns, e.g., the oxy-fuel gas type, plasma arc spray guns and electric arc spray guns. Combustion flame spray guns require a source of fuel, such as acetylene, and oxygen and the temperatures produced therein are usually relatively low and often incapable of spraying materials having melting points exceeding 5,000° F. Plasma arc spray guns are usually the most expensive type and they produce much higher temperatures than the combustion type, e.g. up to approximately 30,000° F. Furthermore, plasma arc spray guns require a source of inert gas, such as argon, for creation of the plasma, and the gas flow rate and electric power therefor require extremely accurate control for proper operation. On the other hand an electric arc spray gun simply requires a source of electric power and a supply of compressed air or other gas, as is well known, to atomize and to propel the melted material in the arc to the substrate or target.

Many different base or substrate materials may be coated by thermal spraying techniques, including ferrous and non-ferrous materials, such as iron, steel, aluminum and the like. However, when most conventional coating materials are sprayed, whether initially in wire, rod, or powder form, the base material requires substantial preliminary preparation, such as roughening by grit blasting or the like, under-cutting, preheating and so on, in order to ensure sufficient adhesion of the sprayed coating to the base material. Sometimes postspraying treatment, such as fusing or sintering, is required to effect good bonding between the coating and the substrate.

A recent development in the art of spray coating has been the use of an exothermic spray material in the form of powder wherein each particle of the powder is a composite composed of nickel and aluminum. This material, one type of which is sold under the numerical identification 404 and another 450 by Metco, Inc., Westbury N.Y., when sprayed in a thermal spray device will undergo an exothermic reaction and will bond reasonably well to a clean, smooth, i.e. not roughened, base material surface coating the latter. One problem with the method of thermal spraying such exothermic or synergistic powder material is the difficult task of manufacturing the necessary specialized composite powder particles. It has been found that spraying simply a mixture of powdered aluminum particles and powdered nickel particles will not work to achieve the necessary substantially complete exothermic reaction for a good bond to an unprepared base material without further treatment of the coated base material. Another disadvantage to this method of spraying such composite particles is incomplete reaction in the arc/-flame thus depositing unreacted particles plus free nickel and free aluminum, both rather weak materials when compared to their products.

SUMMARY OF THE INVENTION

In accordance with the present invention, an alloy of nickel and aluminum in wire form, "wire" implying elongated material dimensioned from a thin strand to a relatively thick rod, is supplied as a wire feed and is sprayed in an electric arc spray gun to coat a substrate or base material, such as steel or aluminum. Depending on the relative weight percentages of aluminum and nickel in the alloy, there also may be contained therein, i.e. in the wire, varying percentages of intermetallics of nickel and aluminum, such as NiAl or $Ni_3Al$, as will be apparent from a phase diagram of nickel and aluminum. Hereinafter when reference is made to nickel aluminum alloy or nickel titanium alloy it is to be understood that the alloy material also may include intermetallics of nickel and aluminum or nickel and titanium, respectively.

Upon being melted, atomized and sprayed by an electric arc spray gun the nickel aluminum alloy and possibly contained intermetallics, if any, material is deposited at temperatures normally greater than 1,400° F. onto a cool, clean, smooth or ground substrate or base material. The sprayed material will bond well to clean, smooth or ground base materials usually to form a coating having adhesion and cohesion parameter or properties approximately equal to or greater than those parameters or properties of a coating formed by thermal spraying exothermically reacting powder. Analytical results of tests of base materials coated with electric arc sprayed nickel aluminum alloy provided in wire form tend to indicate that the secure bond between the base and the coating is due to atomic diffusion or metallurgical influences wherein atoms of the deposit coating are carried into the base or substrate and atoms of the substrate are carried into the deposit coating. Also in accordance with the invention an alloy of nickel and titanium may be used in the same manner and with similar results as the nickel aluminum alloy; however, the invention will be described in detail mostly with respect to the electric arc spraying of a nickel aluminum alloy wire.

In undertaking the method of the present invention whereby a wire comprised of a nickel aluminum alloy is supplied to an electric arc spray gun and that gun is used to apply a spray coating to a base material, a number of important advantages are realized over the prior art. Firstly, the process uses an electric arc spray gun, which is more economically operated than other thermal spray equipment. Second, the material to be sprayed is supplied as a wire, which is more convenient to use than powder. The wire may be a thin strand all the way up to a relatively thick rod as long as it is suitable for spraying through an electric arc spray gun. Third, the wire is readily formed as an alloy of the two primary materials nickel and aluminum or nickel and titanium, as mentioned above also possibly with respective intermetallics, and with varying amounts of additional hardening and fluxing additives. Fourth, the cohesive, adhesive and hardness attributes of the coating on an article formed by the method of the invention are generally equivalent to or better than corresponding attributes for a coating on an article sprayed with powder using other thermal spray devices.

With the foregoing in mind it is a primary object of the invention to provide a method of improved electric arc spraying as in the noted respects.

Another object of the invention is to provide a self-bonding sprayed coating to ferrous and non-ferrous substrates, which do not require any substantial preliminary preparation to ensure a strong bond between the coating and the substrate.

An additional object of the invention is to electric arc spray a wire comprised of an alloy including at least two materials that self-bond to a base or substrate material, and, more particularly, wherein the alloy comprises nickel and aluminum or nickel and titanium and possibly additional respective intermetallics.

A further object of the invention is to provide an article including a base or substrate having at least a partial coating of an alloy of nickel and aluminum or an alloy of nickel and titanium applied by electric arc spraying nickel aluminum alloy wire or nickel titanium alloy wire onto a surface of the base or substrate.

Still another object of the invention is to provide a convenient, relatively uncomplicated, relatively inexpensive and effective method of electric arc spraying a self-bonding material onto a base or substrate material and an article formed thereby.

These and other objects and advantages of the present invention will become more apparent as the following description proceeds.

To the accomplishment of the foregoing and related ends the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

DESCRIPTION OF THE PREFERRED EMBODIMENT

Figure 1:
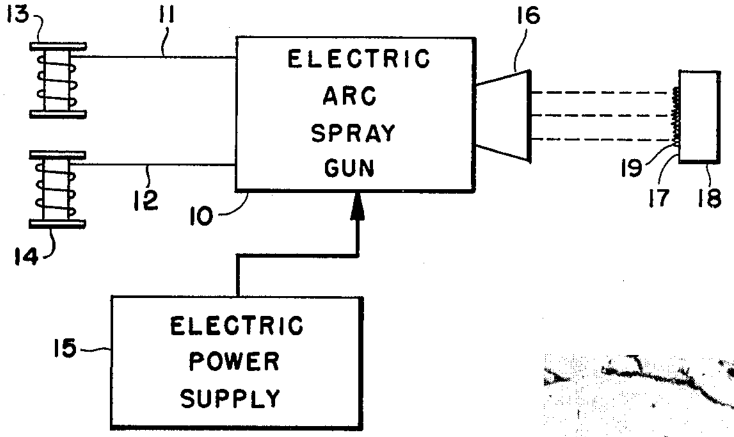
FIG. 1 is a schematic representation of an electric arc spray gun apparatus for carrying out the method of the invention to produce a sprayed, self-bonding coating on a base or substrate material.

Wire comprised of an alloy of nickel and aluminum or an alloy of nickel and titanium, each possibly containing varying percentages of intermetallics depending on the respective weight percents of nickel and aluminum or nickel and titanium according to the respective phase diagrams, is fed to an electric arc spray gun, such as an Arcspray 200 electric arc spray gun manufactured and sold by Metallisation Limited, Dudley, Worcs., England, a Metco E/A gun, or the like. The wire alloy feed may comprise approximately from 80 to 98% by weight nickel and approximately from 2 to 20% by weight aluminum, and preferably comprises approximately 90 to 95% by weight nickel and approximately 4 to 6% by weight aluminum. Hardening and fluxing additives, such as carbon, manganese, sulfur, silicon, titanium, copper and iron, also may be included in various respective amounts. Preferably the wire alloy comprises a minimum of 93% nickel, from 4 to 5.2% aluminum, from 0.25 to 1.00% titanium and no more than a maximum of 0.25% copper, 0.50% manganese, 0.60% iron, 1.7% silicon, 0.3% carbon, and 0.01% sulfur—all these being respective percents by weight.

Although the wire is comprised of an already formed alloy, during which formation the intermetallics also may be formed, the actual compounds in the alloy are not known with accuracy; however, the particular compounds comprising the alloy are not believed critical to the self-bonding of the thermal sprayed coating of the alloy wire on a base material.

When using nickel titanium alloy wire, the wire alloy may comprise, by weight, approximately from 40 to 70% nickel and approximately from 30 to 60% titanium, and preferably comprises approximately 54 to 56% nickel and approximately 44 to 46% titanium. Hardening and fluxing additives also may be included, as described above.

The wire is melted in the electric arc developed in the electric arc spray gun and the molten particles are propelled by an air or other gas stream flow toward a surface of a base or substrate material for coating the same. During this spraying process, the nickel and aluminum alloy or nickel and titanium alloy will be superheated to temperatures exceeding the melting points of the constituents or their alloys and self-bond to said substrate or base metal.

In the present invention the material to be sprayed is in the form of a wire comprised of an alloy of nickel and aluminum or nickel and titanium--not composite particles, not closely associated particles and not two different materials making up, respectively, different strands of a multiple strand wire. The nickel and aluminum alloy or nickel and titanium alloy is melted or at the least substantially softened in the arc of an electric arc spray gun. The hot material is then propelled by an air or other gas station blast to the surface of a base or substrate to coat the same. As will be described in more detail below, the sprayed material of the invention will bond well to the ground clean and smooth surface of a base apparently due primarily to atomic diffusion at the interface.

Referring now particularly to FIG. 1, a conventional electric arc spray gun 10 receives a material input feed of two wires 11, 12 from two wire spools 13, 14 and an electrical input from a power supply 15. Each of the wires 11, 12 is comprised of a nickel aluminum alloy, possibly with nickel and aluminum intermetallics and possibly with added fluxing and hardening additives. Proximate the output or nozzle 16 of the gun 10, an electric arc is created by power from the supply 15 that may be fed to the ends of both the wires, which are brought toward one another to create the electric arc in known manner. The ends of the wires are preferably melted in the heat of the arc, and an air blast created by an external compressed air supply, not shown, may atomize the material in the arc and propels the hot melted material to the surface 17 of the base or substrate material 18 to build a coating 19 thereon. A feed mechanism in the spray gun 10 feeds the wires 11, 12 from the spools 13, 14 to the arc area to maintain a wire supply there, as is conventional. The sprayed coating will adhere well to many ferrous and non-ferrous substrates without any substantial preliminary preparation of the substrate except to ensure that it is clean, for example, using an emery cloth.

The feed wires 11, 12 alternatively may be formed of a nickel titanium alloy, which also self-bonds satisfactorily to the smooth clean surface of ferrous and non-ferrous substrates upon being electric arc sprayed to coat the same. When using a nickel titanium alloy wire feed it is preferred that the wire be comprised approximately from 40 to 70% by weight nickel and approximately from 30 to 60% by weight titanium, and preferably is comprised of from 54 to 56% by weight nickel and from 44 to 46% by weight titanium. As in the case with the nickel aluminum alloy, the wire feed may include intermetallics as well as additional hardening and fluxing additives.

In Examples I – IV and VI below the sprayed nickel aluminum alloy wire was comprised of the following materials, indicated as percents by weight as follows:

TABLE I

| Element: | C | Mn | S | Si |
|---|---|---|---|---|
| NiAl Alloy Wire | 0.14 | 0.26 | 0.005 | 0.49 |

| Element: | Ni | Ti | Cu | Al | Fe |
|---|---|---|---|---|---|
| NiAl Alloy Wire | 94.29 | 0.42 | 0.10 | 4.31 | 0.05 |

EXAMPLE I

An electric arc spray gun supplied with a nickel aluminum alloy wire feed was used to spray coat several different substrate materials, including hardened ($R_c$ 50 minimum) AISI-1095 steel and aluminum samples. Before being spray coated, all of the substrate specimens were ground smooth to remove surface irregularities and half of the substrate specimens then were roughened by grit blasting with SAE No. 20 mesh alumina. After such preparation, both the ground smooth and the roughened substrate specimens were electric arc sprayed with the nickel aluminum alloy wire to a 0.25 to 0.30 inch thickness.

Adhesion tests then were performed of the coated substrates according to ASTM C633-69 "Adhesion or Cohesive Strength of Flame Sprayed Coatings." The measured coating strength is presented in Table II.

TABLE II

| SUBSTRATE and MATERIAL | CONDITION | TENSILE/ BOND STRENGTH (psi) ACTUAL | AVERAGE |
|---|---|---|---|
| | | 4,500 | |
| | GROUND | 4,900 | 4,767 |
| | | 4,900 | |
| STEEL | | | |
| | | 4,900 | |
| | ROUGHENED | 6,000 | 5,400 |

TABLE II-continued

| SUBSTRATE and MATERIAL | CONDITION | TENSILE/ BOND STRENGTH (psi) ACTUAL | AVERAGE |
|---|---|---|---|
| | | 5,300 | |
| | | 2,700 | |
| | GROUND | 1,500 | 2,500 |
| ALUMINUM | | 3,300 | |
| | | 5,400 | |
| | ROUGHENED | 6,700 | 6,033 |
| | | 6,000 | |

Figure 2:
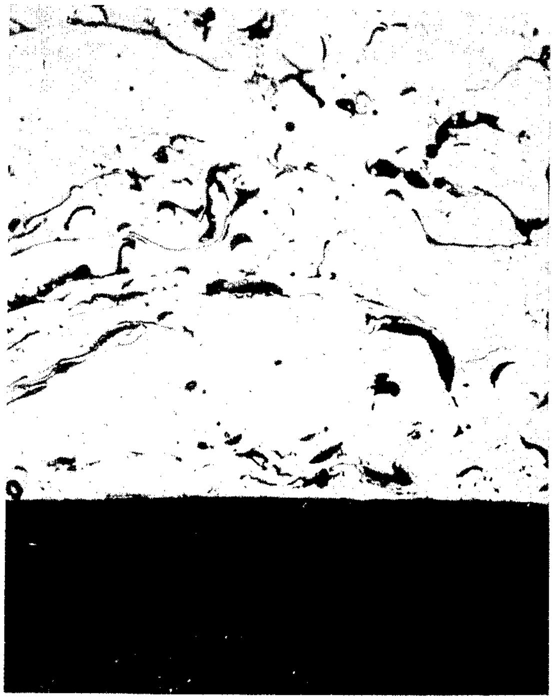
FIG. 2 is a magnified view at 250 times of a portion of an article formed in accordance with the method of the invention showing the interfaces of a sprayed coating and a steel substrate.

A transverse section of one of the coated, unroughened substrate specimens was examined by light microscopy. Structurally, as seen in FIG. 2, the deposit, the upper half of the figure, was morphologically similar to other thermal sprayed materials, i.e., undulating lamellar particles separated by oxides with interdispersed voids. Dissimilarity was noticed, however, at the interface. The coating-substrate interface was extremely tight, and at some points along the substrate side of the interface, there was a change in the martensitic structure, as can be seen slightly right of center along and below the interface line. Apparently on impact with the steel, the lower and darker half of FIG. 2, the hot, molten nickel aluminum particles caused the martensite to change into upper transformation products, probably retained austenite and some lightly tempered martensite, and to have accomplished this transformation, the steel would have had to have been heated above its critical temperature of approximately 1,400° F. There was, however, no evidence of fusion or of a bond alloy layer at the interface, which led to the belief that the achieved self-bonding of the coating to the substrate was not chemical or metallurgical but might be due to atomic diffusion.

A qualitative spectrographic analysis of the sprayed coating was made with the following result:

TABLE III

| | | | |
|---|---|---|---|
| Mn | Heavy Trace | Al | Minor |
| Si | Heavy Trace | B | Slight Trace |
| Cr | Heavy Trace | Co | Trace |
| Ni | Major | Cu | Heavy Trace |
| Ti | Minor | Zr | Slight Trace |
| Mo | Heavy Trace | Ag | Detected |
| Fe | Heavy Trace | Pb | Slight Trace |
| Mg | Very Slight Trace | Sn | Trace |
| Zn | Detected | | |

EXAMPLE II

A 12 inch by one inch diameter steel bar produced from hardened ($R_c$ 50 minimum) AISI-1095 steel, which was heat treated and ground smooth on its surface, was spray coated with a 0.150 inch thickness of material by an electric arc spray gun having the nickel aluminum alloy wire supplied thereto, as described above. The macrohardness of the coating was measured on the Rockwell B scale using a 1/16th ball indentor with a 100kg load, and the measured microhardness was in the range of from 69 to 71. Moreover, a microhardness of the same sample was determined utilizing a rhomboidal diamond indentor and a 100 gm load (KHN $_{100}$). In accordance with this latter test is was possible to isolate and to determine the hardness of individual particles, the average measurement of hardness being 179 $KHN_{100}$, which value converts to $R_b$85. The difference in coating and particle hardness was attributed to voids and oxides within the coating which collapse under the load of the ball indentor. Furthermore, the coating density was measured and found to be 0.2758 pounds per cubic inch.

EXAMPLE III

Figure 3:
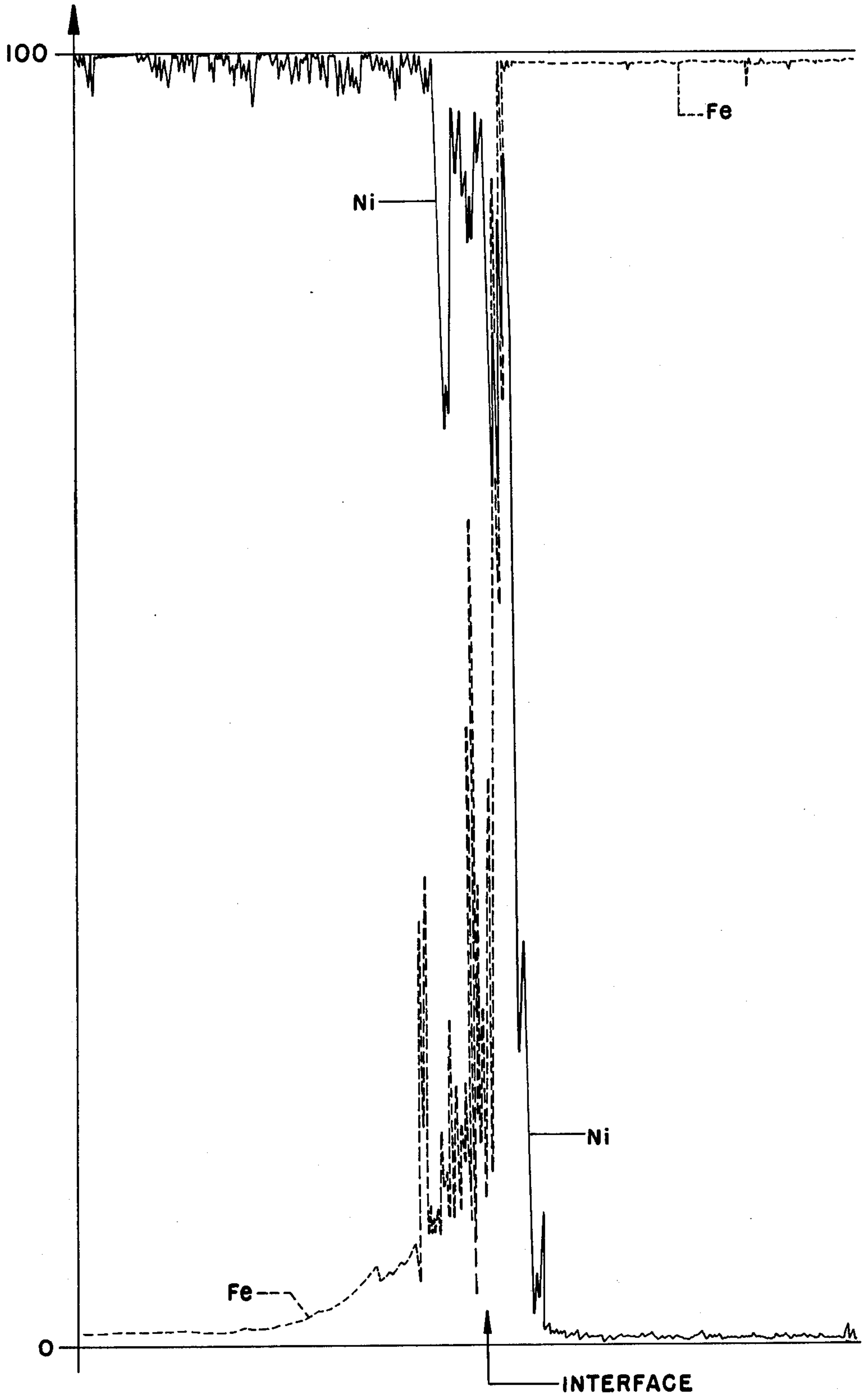
FIG. 3 is a graph representing a microprobe analysis using a scanning electron microscope across an electric arc sprayed nickel aluminum alloy--steel interface illustrating atomic diffusion.

A nickel aluminum alloy wire was supplied to an electric arc spray gun and the gun was used to spray coat a low carbon steel substrate. The coated substrate was prepared for a metallographic viewing using a scanning electron microscope (SEM). A graph illustrative of the microprobe analysis across the coating-steel interface is illustrated in FIG. 3. In the graph, which is read from right to left beginning approximately three microns beneath the surface of the steel substrate, the iron content thereof is at maximum value, whereas there is virtually no nickel found. Similarly, at a depth approximately three microns into the coating, beginning at the left-hand side of the graph, the amount of nickel is at a substantially maximum level and substantially no iron is found. At the interface, however, there is no sharply defined boundary; rather, it is quite clear that a relatively large number of iron atoms or particles have diffused into the nickel coating and a large number of nickel atoms or particles have diffused into the iron substrate. This atomic migration or diffusion to a depth somewhat less than one micron into the substrate and into the coating appears to be the reason for the high tenacity or affinity of the electric arc spray coating to the substrate.

The chemistry of the coating material was determined by wet analysis, and the values in percents by weight obtained are noted below:

TABLE IV

| | | | |
|---|---|---|---|
| C | 0.06 | Ti | 0.65 |
| Mn | 0.21 | Cu | 0.008 |
| S | 0.003 | Al | 5.45 |
| Si | 0.34 | Fe | 0.043 |
| Ni | 92.80 | | |

EXAMPLE IV

The adherence of a coating formed by an electric arc sprayed nickel aluminum alloy wire to various engineering metals was ascertained. Each of the substrate specimens was clean and unroughened, and each was electric arc sprayed using the nickel aluminum alloy wire. The adhesion tests were carried out as described above in Example I for the following materials, and the obtained adhesive/cohesive strength between the coating and the substrate were as follows:

TABLE V

| SUBSTRATE MATERIAL | ADHESIVE/COHESIVE STRENGTH ACTUAL (psi) | AVERAGE (psi) |
|---|---|---|
| Steel, AISI 4330 | 5180 | |
| Annealed, $R_B96$ | 5210 | 5280 |
| | 5450 | |
| | 4710 | |
| Hardened, $R_C48$ | 4890 | 4713 |
| | 4540 | |
| Carburized AISI 1010 | 4890 | |
| $F_C62$ | 4850 | 4883 |
| | 4910 | |
| Nitrited, Nitralloy 135G | 4620 | |
| $R_C48$ | 5610 | 5033 |
| | 4870 | |
| 18-8 Stainless Steel | 4120 | |
| $R_B75$ | 4340 | 4200 |
| | 4140 | |
| Martensitic Stainless | 3890 | |
| AISI 431, $R_C44$ | 4100 | 4107 |
| | 4330 | |

TABLE V-continued

| SUBSTRATE MATERIAL | ADHESIVE/COHESIVE STRENGTH ACTUAL (psi) | AVERAGE (psi) |
|---|---|---|
| Age Hardenable Steel | 4910 | |
| 17-4pH, $R_C42$ | 4870 | 4857 |
| | 4790 | |
| Aluminum | 3200 | |
| 1100-0 | 1800 | 2303 |
| | 1910 | |
| 2024-T6 | 2200 | |
| | 2340 | 2210 |
| | 1950 | |
| 6061-T6 | 2700 | |
| | 2380 | 2583 |
| | 2670 | |
| Magnesium | 1790 | |
| AZ80-T6 | 1800 | 1847 |
| | 1950 | |
| Gray Cast Iron | 4280 | |
| | 3170 | 3633 |
| | 3450 | |
| Titanium | 3320 | |
| Ti6A14V | 3900 | 3397 |
| | 2970 | |
| Copper | 2000 | |
| OFHC | NO-TEST | 1390 |
| | 780 | |

From the tests conducted as described in Example IV, it appears that an electric arc sprayed nickel aluminum alloy wire material will not adhere very well to a copper substrate. However, adherence to various types of ferrous materials as well as nonferrous materials, including aluminum, magnesium and titanium, clearly is manifest.

EXAMPLE V

Three different nickel aluminum alloy wires were electric arc sprayed onto respective substrates to determine whether any variations occurred in adhesive and cohesive strengths and in microhardness and macrohardness characteristics of the respective sprayed coatings as the actual ratio of nickel to aluminum and the quantity of hardening, fluxing and other additives were varied. The three nickel aluminum alloy wires, designated H, I and W were first analyzed by wet chemical analysis to determine their chemical makeup in percent by weight, and the result of that analysis is presented as follows:

TABLE VI

| Element: | C | Mn | S | Si | Ni |
|---|---|---|---|---|---|
| Wire Sample | | | | | |
| "H" | 0.005 | 0.23 | — | 1.68 | 92.397 |
| "I" | 0.040 | 0.23 | — | 0.47 | 93.636 |
| "W" | 0.003 | 0.27 | — | 1.02 | 92.82 |

| Element: | Ti | Cu | Al | Fe |
|---|---|---|---|---|
| Wire Sample | | | | |
| "H" | 0.44 | 0.08 | 5.06 | 0.108 |
| "I" | 0.40 | 0.08 | 5.05 | 0.094 |
| "W" | 0.40 | 0.72 | 5.14 | 0.275 |

The test procedures and specimen preparation were performed similar to those described above with reference to Examples I and II, and the respective specimen substrates were formed of aluminum, iron, or copper.

Each of the respective specimen substrates was electric arc sprayed with one of the nickel aluminum alloy wires indicated above as H, I or W. A Metco electric arc spray gun was used according to the following parameters:

| | |
|---|---|
| Electrodes: | 15 Gage |
| Atomizing air: | 92 psi |
| Amperage: | 260 to 275 amps. |
| Voltage: | 34 volts |

The tensile/bond strength of the respective spray coated substrates and the failure mode of each were determined as above, and the results are presented in the following Table VII. Under the Failure Mode category in the table, the location of the failure and the type of failure are indicated. For example, "Interface/Ad" means that failure occurred at the interface between the sprayed coating and the substrate and the failure was in the adhesion of the coating to the substrate. "Coating/Cohe" means that failure occurred only in the coating itself and the failure was in the cohesiveness or cohesion of the coating material itself. "Epoxy Failure" means that the failure occurred in the epoxy material securing the test sample to the testing apparatus.

TABLE VII

| MATERIAL | | TENSILE/BOND STRENGTH | | |
|---|---|---|---|---|
| COATING | SUBSTRATE | ACTUAL, (psi) | AVG., (psi) | FAILURE MODE LOCATION/TYPE |
| | | 6700 | | Interface/Ad |
| | Aluminum | 5600 | 6200 | Interface/Ad |
| | | 6300 | | Interface/Ad |
| | | 4800 | | Coating/Cohe |
| H | Iron | 5600 | 4867 | Coating/Cohe |
| | | 4200 | | Coating/Cohe |
| | | No Test | | |
| | Copper | No Test | 2167 | |
| | | 6500 | | Interface/Ad |
| | | 6700 | | Interface/Ad |
| | Aluminum | 6000 | 5867 | Interface/Ad |
| | | 4900 | | Interface/Ad |
| | | 5200 | | Coating/Cohe |
| I | Iron | 6500 | 5733 | Coating/Cohe |
| | | 5500 | | Coating/Cohe |
| | | No Test | | |
| | Copper | No Test | | |
| | | No Test | | |
| | | 7000 | | Epoxy Failure |
| | Aluminum | 8200 | 7533 | Epoxy Failure |
| | | 7400 | | Interface/Ad |
| | | 5200 | | Coating/Cohe |
| W | Iron | 6500 | 5733 | Coating/Cohe |
| | | 5500 | | Coating/Cohe |
| | | No Test | | |
| | Copper | No Test | | |
| | | No Test | | |

None of the spraying materials adhered well to the copper substrates. For each of the iron substrates, the failure mode was cohesive in nature, i.e., failure occurred due to breaking of the coating rather than separation at the interface. In all but two of the aluminum coated substrates the failure was of an adhesive nature, i.e., failure occurred at the interface. In two instances of aluminum coated substrates, the failure was at the epoxy coupling used in the test.

From the results presented in the above table, it will be clear that the nickel aluminum alloy wire that is electric arc sprayed to coat smooth surfaces of aluminum and iron substrates will self-bond extremely well to those substrates. Coating microhardness for each of the specimens including the coated substrates was determined utilizing the rhomboidal Knoop indentor with a 50 gm load. Macrohardness was ascertained using a one kilogram load and the Vickers hardness (DPH) tester, the measurements using the latter being converted for facility of comparison to the Rockwell C scale indicated in column $R_c$ in Table VIII below. The results of the microhardness and macrohardness measurements are presented as follows:

TABLE VIII

| MATERIAL | | | | |
|---|---|---|---|---|
| COATING | SUBSTRATE | $KHN_{50}$ | DPH | $R_c$ CONVERSION |
| | Aluminum | 449 | 283 | 27.7 |
| H | Iron | 562 | | |
| | Copper | 562 | | |
| | Aluminum | 631 | 316 | 31.9 |
| I | Iron | 618 | 311 | 31.2 |
| | Copper | 605 | 292 | 28.9 |
| | Aluminum | 605 | 279 | 27.0 |
| W | Iron | 670 | 283 | 27.7 |
| | Copper | 710 | 293 | 28.9 |

In view of the above two tables presented in this example, it is clear that nickel aluminum alloy wire having varying proportions of fluxing and hardening agents and some variation in the ratio of nickel to aluminum will exhibit good self-bonding properties when electric arc sprayed onto steel or aluminum substrates. Variations in the ratio of nickel to aluminum and in the additives will not appreciably reduce the bond tenacity. Moreover, by varying or shifting the fluxing and hardening additives in the nickel aluminum alloy wire, the hardness of the resulting sprayed coating is affected.

Figure 4:
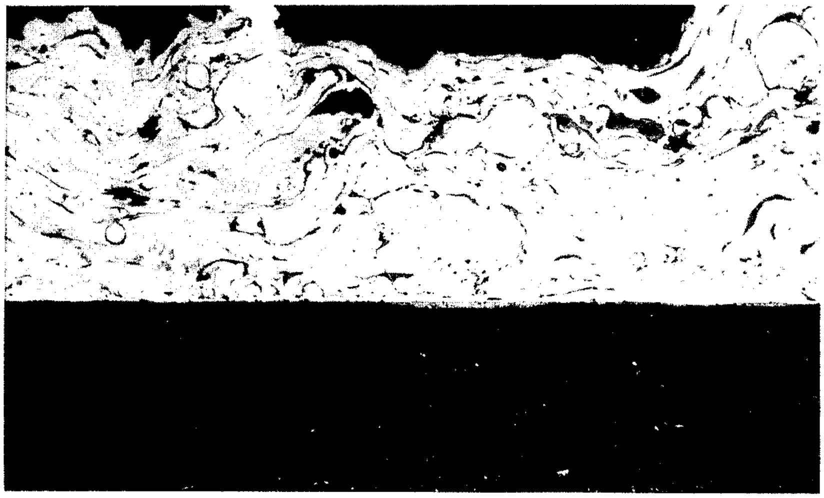
FIG. 4 is a magnified view at 250 times of a portion of an article formed in accordance with the method of the invention illustrating particularly the interface of a sprayed nickel aluminum coating and a steel substrate.

The microstructure of respective steel specimens having smooth or ground surfaces onto which the respective nickel aluminum alloy wires H, I and W were sprayed was examined. A photomicrograph taken of the interface of the nickel aluminum alloy wire I applied over a hardened, tempered, ground smooth martensitic substrate is illustrated in FIG. 4. The lower and darker portion of the figure represents the martensite and the upper lamellar and lighter colored area represents the sprayed coating. Approximately at a location slightly right of the center of the figure is a lightened area in the martensite, which is an area of untempered martensite caused, apparently, due to the heat of the nickel aluminum coating as it is applied to the martensite.

EXAMPLE VI

Samples of a nickel aluminum wire feed, as identified in Table I above, were electric arc sprayed onto respective steel and aluminum substrates and subsequently heat treated as follows:

| | | |
|---|---|---|
| Aluminum | - | 12 hours at 950° F., water quenched, aged 6 hours at 525° F. |
| Steel | - | 8 hours at 1200° F., furnace cooled. |

Aside from exhibiting excellent resistance to thermal shock the samples displayed higher than normal adhesive strength. When tested in accordance with Example I fracture occurred not in the deposit but rather in the epoxy. Results were as follows:

| | |
|---|---|
| Aluminum | 9300 psi |
| | 10800 psi |
| Steel | 11200 psi |
| | 10900 psi |
| | 11800 psi |

Thus, the described treating process, including aging, will increase the overall strength of the coating and the coatingsubstrate bond strength. Therefore, it will be clear that the overall integrity of the deposit or coating may be increased by heat treatment and/or aging.

While the foregoing examples and discussion have been directed to the electric arc spraying of a nickel aluminum alloy in wire form to coat a smooth substrate in a manner such that the coating will self-bond to the smooth surface of the substrate, other alloy materials that will self-bond when sprayed from an electric arc spray gun also may be used in accordance with the invention. As described above, one such material is an alloy of nickel and titanium comprised of approximately 40 to 70% by weight nickel and approximately 30 to 60% by weight titanium and preferably approximately 54 to 56% by weight nickel and approximately 44 to 46% by weight titanium.

It has thus been found that an alloy of nickel and aluminum in wire form which is electric arc sprayed to coat a clean smooth substrate will self-bond to the substrate without the occurrence of an exothermic reaction. On the other hand pre-alloyed nickel aluminum powder does not bond well to such a substrate when sprayed in a plasma or combustion gas, nor will nickel aluminum alloy wire bond well to such a substrate when combustion gas sprayed.

Moreover, it also has been found that pre-alloyed nickel aluminum wires when electric arc sprayed exceed the reported property values of composites applied by other thermal spray techniques. Furthermore, electric arc spray rates and deposit efficiencies, especially using the nickel aluminum alloy wire or nickel titanium alloy wire in accordance with the invention, are appreciably higher yielding of superior deposits at lower costs than thermal spraying synergistic, exothermic materials.

The embodiments of the invention in which an exclusive property or privilege is claimed are defined as follows:

1. A method of thermal spraying a substrate to deposit a self-bonding coating on such substrate, comprising supplying an electric arc thermal spray gun with a wire feed comprising an alloy of nickel and aluminum or titanium, and using such electric arc thermal spray gun, spraying said wire feed onto such substrate to coat the same thereby to establish a diffusion bond between such coating and such substrate to provide a self-bonding coating on such substrate.

2. A method as set forth in claim 1, wherein said step of supplying comprises supplying a wire feed comprising an alloy of nickel and aluminum.

3. A method as set forth in claim 1, wherein said step of supplying comprises supplying a wire feed comprising an alloy of approximately from 80 to 98 percent by weight nickel and approximately from two to twenty percent by weight aluminum.

4. A method as set forth in claim 1, wherein said step of supplying comprises supplying a wire feed comprising an alloy of approximately from 90 to 95 percent by weight nickel and approximately from four to six percent by weight aluminum.

5. A method as set forth in claim 1, wherein said step of supplying comprises supplying a wire feed comprising an alloy of nickel and titanium.

6. A method as set forth in claim 1, wherein said step of supplying comprises supplying a wire feed comprising an alloy of approximately from forty to seventy percent by weight nickel and approximately from thirty to sixty percent by weight titanium.

7. A method as set forth in claim 1, wherein said step of supplying comprises supplying a wire feed comprising an alloy of approximately from fifty-four to fifty-six percent by weight nickel and approximately from forty-four to forty-six percent by weight titanium.

8. A method as set forth in claim 1, wherein said step of spraying comprises spraying said wire feed onto a smooth, clean substrate of metallic material.

9. A method as set forth in claim 1, further comprising the step of heat treating such coated substrate.

10. An article of manufacture, comprising a metallic substrate and a coating of an alloy of nickel and aluminum or titanium applied to said substrate by supplying to an electric arc thermal spray gun a wire feed comprising an alloy of nickel and aluminum or titanium, and using such electric arc thermal spray gun, spraying said wire feed onto said substrate to coat the same, thereby to establish a diffusion bond between said coating and said substrate, whereby said coating is self-bonding to said substrate.

11. An article as set forth in claim 10, wherein said coating comprises an alloy of nickel and aluminum.

12. An article as set forth in claim 10, wherein said coating comprises an alloy of approximately from eightly to ninety-eight percent by weight nickel and approximately from two to twenty percent by weight aluminum.

13. An article as set forth in claim 10, wherein said coating comprises an alloy of approximately from ninety to ninety-five percent by weight nickel and approximately from four to six percent by weight aluminum.

14. An article as set forth in claim 10, wherein said coating comprises an alloy of nickel and titanium.

15. An article as set forth in claim 10, wherein said coating comprises an alloy of approximately from forty to seventy percent by weight nickel and approximately from thirty to sixty percent by weight titanium.

16. An article as set forth in claim 10, wherein said coating comprises an alloy of approximately from fifty-four to fifty-six percent by weight nickel and approximately from forty-four to forty-six percent by weight titanium.

17. An article as set forth in claim 10, wherein said coated substrate is heat treated.

* * * * *

REEXAMINATION CERTIFICATE (1150th)

United States Patent [19]

[11] B1 4,027,367

Rondeau

[45] Certificate Issued Nov. 14, 1989

[54] SPRAY BONDING OF NICKEL ALUMINUM AND NICKEL TITANIUM ALLOYS

[75] Inventor: Henry S. Rondeau, Shaker Heights, Ohio

[73] Assignee: Virginia C. Rondeau, Executrix of State of Henry S. Rondeau

Reexamination Request:
No. 90/001,481, Apr. 4, 1988

Reexamination Certificate for:
Patent No.: 4,027,367
Issued: Jun. 7, 1977
Appl. No.: 598,822
Filed: Jul. 24, 1975

[51] Int. Cl.[4] .......................... B05D 1/06; B32B 15/04; B32B 15/20

[52] U.S. Cl. ........................................ 428/652; 427/37; 428/653; 428/654; 428/660

[58] Field of Search ............................ 427/37, 34, 423; 29/196.2, 196.6, 197, 197.5, 198

[56] References Cited

U.S. PATENT DOCUMENTS 3,436,248 4/1969 Dittrich .............................. 117/105
3,947,607 3/1976 Gazzard .............................. 427/37

OTHER PUBLICATIONS

Brochure "Material: Nickel Aluminide"-No. PP66, by Bay State Abrasives.
Technical Bulletin "Amperit Powders for Thermal and Plasma Spraying", by Herman C. Starck, Berlin (1973).

*Primary Examiner*—Bernard D. Pianalto

[57] ABSTRACT

An alloy of nickel and aluminum, which also may contain varying percentages of intermetallics, in the form of a wire or rod is sprayed in an electric arc spray gun to form a self-bonding coating on a smooth, clean substrate. Alternatively an alloy of nickel and titanium, which also may contain varying percentages of intermetallics, in the form of a wire may be similarly electric arc sprayed to effect a self-bonding coating on a substrate. The nickel aluminum alloy and possibly intermetallics or the nickel titanium alloy and possibly intermetallics are supplied as a wire feed to the electric arc spray gun, and when heated in the electric arc of the spray gun and sprayed onto a substrate will form a coating that has a high degree of tenacity to many metal substrates and also has a moderate degree of hardness, low $R_c$, high $R_b$. The self bonding is attributed to the formation of superheated liquid in the arc process and the affinity of that superheated liquid to iron, nickel, aluminum, etc.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-7, 10-16 are determined to be patentable as amended.

Claims 8, 9 and 17, dependent on an amended claim, are determined to be patentable.

New claims 18-20 are added and determined to be patentable

1. A method of thermal spraying a substrate to deposit a self-bonding coating on such substrate, comprising supplying an electric arc thermal spray gun with a wire feed comprising an alloy of nickel and aluminum or titanium, and using such electric arc thermal spray gun, spraying said wire feed onto such substrate to coat the same thereby to establish a diffusion bond between such coating and such substrate to provide a self-bonding coating on such substrate *without exothermic reaction of composite materials during spraying.*

2. A method as set forth in claim 1, wherein said step of supplying comprises supplying a wire feed [comprising] *consisting essentially of* an alloy of nickel and aluminum.

3. A method as set forth in claim 1, wherein said step of supplying comprises supplying a wire feed [comprising] *consisting essentially of* an alloy of approximately from 80 to 98 percent by weight nickel and approximately from two to twenty percent by weight aluminum.

4. A method as set forth in claim 1, wherein said step of supplying comprises supplying a wire feed [comprising] *consisting essentially of* an alloy of approximately from 90 to 95 percent by weight nickel and approximaely from four to six percent by weight aluminum.

5. A method as set forth in claim 1, wherein said step of supplying comprises supplying a wire feed [comprising] *consisting essentially of* an alloy of nickel and titanium.

6. A method as set forth in claim 1, wherein said step of supplying comprises supplying a wire feed [comprising] *consisting essentially of* an alloy of approximately from forty to seventy percent by weight nickel and approximately from thirty to sixty percent by weight titanium.

7. A method as set forth in claim 1, wherein said step of supplying comprises supplying a wire feed [comprising] *consisting essentially of* an alloy of approximately from fifty-four to fifty-six percent by weight nickel and approximately from forty-four to forty-six percent by weight titanium.

10. An article of manufacture, comprising a metallic substrate and a coating of an alloy of nickel and aluminum or titanium applied to said substrate by supplying to an electric arc thermal spray gun a wire feed comprising an alloy of nickel and aluminum or titanium, and using such electric arc thermal spray gun, spraying said wire feed onto said substrate to coat the same, thereby to establish a diffusion bond between said coating and said substrate, whereby said coating is self-bonding to said substrate *without exothermic reaction of composite materials during spraying.*

11. An article as set forth in claim 10, wherein said coating [comprises] *consists essentially of* an alloy of nickel and aluminum.

12. An article as set forth in claim 10, wherein said coating [comprises] *consists essentially of* an alloy of approximately from eightly to ninety-eight percent by weight nickel and approximately from two to twenty percent by weight aluminum.

13. An article as set forth in claim 10, wherein said coating [comprises] *consists essentially of* an alloy of approximately from ninety to ninety-five percent by weight nickel and approximately from four to six percent by weight aluminum.

14. An article as set forth in claim 10, wherein said coating [comprises] *consists essentially of* an alloy of nickel and titanium.

15. An article as set forth in claim 10, wherein said coating [comprises] *consists essentially of* an alloy of approximately from forty to seventy percent by weight nickel and approximately from thirty to sixty percent by weight titanium.

16. An article as set forth in claim 10, wherein said coating [comprises] *consists essentially of* an alloy of approximately from fifty-four to fifty-six percent by weight nickel and approximately from forty-four to forty-six percent by weight titanium.

*18. A method of thermal spraying a substrate to deposit a self-bonding coating on such substrate comprising*

*supplying an electric arc thermal spray gun with a wire feed of two separate wires, each said separate wire comprising an alloy of nickel and aluminum or titanium, and*

*using such electric arc thermal spray gun by creating an electric arc between tips of said two separate wires to melt the ends of said wires and atomize the material in the arc for spraying said wire feed onto such substrate to coat the same, thereby to establish a diffusion bond between such coating and such substrate to provide a self-bonding coating on such substrate without exothermic reaction of composite materials during spraying.*

*19. A method as set forth in claim 18, wherein said step of supplying such electric arc thermal spray gun with said two separate wires, each said separate wire consists essentially of an alloy of approximately from 90 to 95 percent by weight nickel and approximately from four to six percent by weight aluminum.*

*20. A method as set forth in claim 19, wherein said step of using such electric arc thermal spray gun to spray includes the spraying of atomized material from said wire feed of said two separate wires onto a smooth, clean substrate of metallic material.*

* * * * *